(12) United States Patent
Watanabe

(10) Patent No.: US 6,496,450 B2
(45) Date of Patent: Dec. 17, 2002

(54) OPTICAL RECORDING/REPRODUCING APPARATUS, OPTICAL ROTATING RECORDING MEDIUM, AND METHOD OF DESIGNING OPTICAL RECORDING/REPRODUCING APPARATUS

(75) Inventor: Tetsu Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 188 days.

(21) Appl. No.: 09/730,233

(22) Filed: Dec. 5, 2000

(65) Prior Publication Data

US 2001/0008502 A1 Jul. 19, 2001

(30) Foreign Application Priority Data

Dec. 22, 1999 (JP) ............................................ 11-365660

(51) Int. Cl.$^7$ ............................................... G11B 11/00
(52) U.S. Cl. ................. 369/13.38; 369/13.33; 369/13.53; 369/275.5; 369/283
(58) Field of Search ................. 369/13.53, 13.35, 369/13.38, 13.33, 112.01, 275.5, 283, 13.13

(56) References Cited

U.S. PATENT DOCUMENTS

| | | | | |
|---|---|---|---|---|
| 4,449,138 A | * | 5/1984 | Ando | 346/135.1 |
| 5,276,674 A | * | 1/1994 | Tanaka | 369/275.3 |
| 5,587,990 A | * | 12/1996 | Watanabe et al. | 369/275.2 |
| 5,838,646 A | * | 11/1998 | Watanabe et al. | 369/13 |
| 6,023,451 A | * | 2/2000 | Kashiwagi et al. | 369/275.5 |
| 6,061,322 A | * | 5/2000 | Jain et al. | 369/99 |
| 6,078,560 A | * | 6/2000 | Kashiwagi | 369/275.5 |
| 6,243,327 B1 | * | 6/2001 | Nakaoki et al. | 369/13 |
| 6,381,208 B1 | * | 4/2002 | Abe et al. | 369/112.01 |

* cited by examiner

Primary Examiner—Tan Dinh
(74) Attorney, Agent, or Firm—Oblon, Spivak, McClelland, Maier & Neustadt, P.C.

(57) ABSTRACT

An optical recording/reproducing apparatus accessing a recording layer of an optical rotating recording medium using an accessing means positioned a predetermined gap away from a surface of said optical rotating recording medium and mounted with an object lens, wherein a thickness of a protective transparent layer of said optical rotating recording medium, a ratio of a defect area with respect to a beam spot area, and the above predetermined gap are values determined by the conditions defined in the following inequalities:

$$G_1 \le t \cdot \sqrt{k\pi} \times \tan\left\{\sin^{-1}\left(\frac{NA}{n}\right)\right\}$$

or $$t \ge \frac{G}{\sqrt{k\pi} \cdot \tan\left\{\sin^{-1}\left(\frac{NA}{n}\right)\right\}}$$

where,
G: gap separating accessing means from surface of optical rotating recording medium,
t: thickness of transparent layer positioned at surface of recording medium of optical rotating recording medium,
n: refractive index of transparent layer, and
NA: numerical aperture of optical system including object lens.

20 Claims, 9 Drawing Sheets

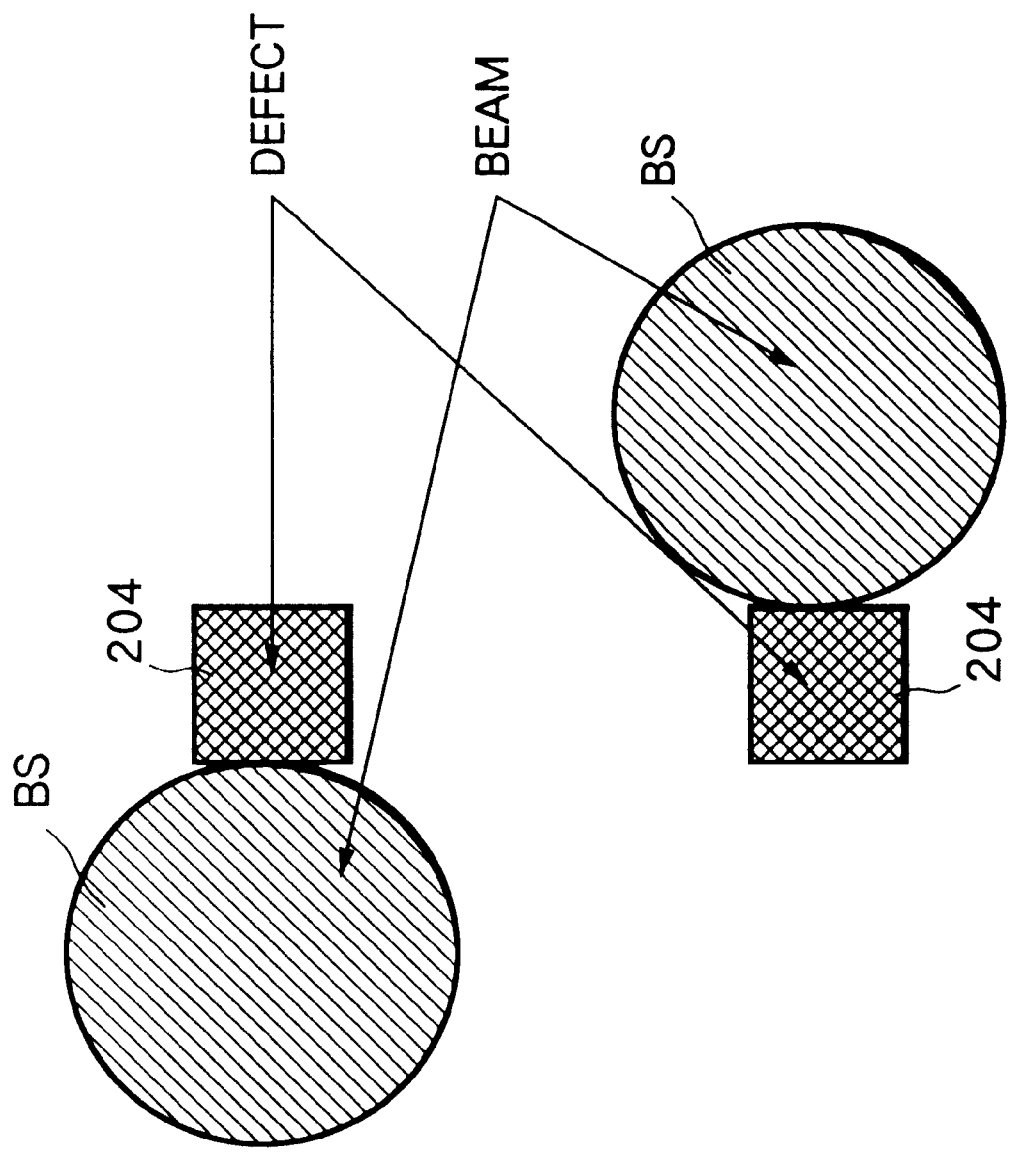

OPTICAL RECORDING/REPRODUCING APPARATUS, OPTICAL ROTATING RECORDING MEDIUM, AND METHOD OF DESIGNING OPTICAL RECORDING/REPRODUCING APPARATUS

BACKGROUND OF THE INVENTION

1. Field of the Invention

The present invention relates to an optical recording/reproducing apparatus for recording/reproducing data by using an optical rotating recording medium such as a magneto-optical disk or an optical disk. More particularly, the present invention relates to a technology on an improved reliability on defects by appropriately setting a thickness of a protective transparent layer of an optical rotating recording medium, a float of a flying head, or a distance between an electromagnetic actuator and an optical rotating recording medium in a flying head type optical recording/reproducing apparatus.

2. Description of the Related Art

In recent years, a laser diode having a short wavelength has been increasingly used to increase the recording density of an optical rotating recording medium used in an optical hard disk drive (optical HDD), optical floppy disk drive (optical FDD), video disk recorder (VDR), magneto-optical disk (MO) drive, and compact disk (CD) drive.

Here, the explanation will be given using a magneto-optical disk as an example of an optical rotating recording medium. Along with the shortening of wavelengths by the use of blue lasers etc., the numerical aperture (NA) of an object lens mounted on a pickup increases. When the numerical aperture increases, the thickness of the protective cover coat glass on the optical rotating recording medium has to be made thinner for suppressing optical aberration in addition to improving the recording density.

When the protective cover coat glass becomes thinner, the distance between a magnetic layer and a magnetic head of the optical rotating recording medium becomes shorter, so it becomes possible to arrange the magnetic system and optical system on the same side and to make the optical recording/reproducing apparatus further smaller.

Assuming the thickness of the protective cover coat glass to be t, the thickness in the case of a past optical rotating recording medium was the thickness of the substrate itself, that is, 1.2 t. In recent DVDs, AS magneto-optical disks (AS-MOs), super compact magneto-optical disks, etc., the thickness of the protective cover coat has been halved to about 0.6 t. Also, the thickness of the protective cover coat is 0.1 t in a VDR disk and about several tens of nm in an optical HDD disk etc.

As the substrate of an optical rotating recording medium becomes thinner, the frequency of read and write errors due to defects such as dust adhering to the optical rotating recording medium increases.

When the distance between the surface of the optical rotating recording medium and the head of the pickup (or electromagnetic actuator) is the same, the thinner the substrate of the optical rotating recording medium, the greater the susceptability to defects due to dust. In this way, if the substrate of the optical rotating recording medium is made thicker as compared with the gap between the head (electromagnetic actuator) and the optical rotating recording medium, the resistance to defects is increased. On the contrary, if the substrate (protective cover coat glass) of the optical rotating recording medium is thin as compared with the gap between the head (electromagnetic actuator) and the optical rotating recording medium, the effects of defects increase.

In the case of a flying head system where the head accesses the optical rotating recording medium while in the floating state, since the gap (distance) between the head and the optical rotating recording medium is narrow, the entry of defects such as dust into the beam spot can be suppressed to a certain extent. In the same way, when using an electromagnetic actuator which accesses an optical rotating recording medium while in a state close to its surface, since the gap between the electromagnetic actuator and the optical rotating recording medium is narrow, the entry of defects such as dust into the beam spot can be suppressed to a certain extent.

Summarizing the disadvantage to be solved by the invention, up until now, no logical and quantitative evaluation has been made as to which degree of dimensions of dust or other defects is allowable correlated with the thickness of the protective cover coat glass, the gap between the optical rotating recording medium and the head, and other factors. Moreover, it was not possible to easily find from the results what the thickness the protective cover coat glass should be, what the float (distance) of the head from the optical rotating recording medium should be, and what other conditions and other design factors should be. Therefore, it was difficult to realize an optical recording/reproducing apparatus having a high reliability against defects.

This disadvantage is particularly notable in an optical recording/reproducing apparatus using a variety of the new types of optical rotating recording media such as the recent new super compact magneto-optical disks, for example, super compact, high density, large capacity magneto-optical disks using blue-color lasers, having a diameter of about 35 to 64 mm, and having a storage capacity of 2 GB (Giga-Bytes) or more, for example, 2 to 17 GB. In such a new technology optical recording/reproducing apparatus, it has been strongly demanded that the linkage among the size of defects, thickness of the protective cover coat glass, float of the head (gap between the head and the optical rotating recording medium), numerical aperture, and other factors be clarified and that the optical recording/reproducing apparatus be designed and the optical recording/reproducing apparatus be produced and operated based on the results.

Furthermore, when arranging a magnetic field modulation overwrite head at the object lens side as in an optical HDD, there is a demand for reduction of the sum of the gap and the substrate thickness in order to reduce the size of the apparatus.

SUMMARY OF THE INVENTION

An object of the present invention is to provide a method of designing an optical recording/reproducing apparatus by finding conditions for optimizing the relationship of the resistance of an optical recording/reproducing apparatus against errors of the overall system (reliability), the gap between the head and optical rotating recording medium, the thickness of the substrate of the optical rotating recording medium and designing the optical recording/reproducing apparatus based on these conditions.

Another object of the present invention is to provide an optical recording/reproducing apparatus produced based on the conditions to realize optimal relationship among the above resistance of the optical recording/reproducing apparatus against errors of the overall system (reliability), the gap between the head and an optical rotating recording medium, and the thickness of the substrate of the optical rotating recording medium.

Still another object of the present invention is to provide an optical rotating recording medium able to be used in the above optical recording/reproducing apparatus.

According to a first aspect of the present invention, there is provided an optical recording/reproducing apparatus accessing a recording layer of an optical rotating recording medium using an accessing means positioned a predetermined gap away from a surface of said optical rotating recording medium and mounted with an object lens, wherein a thickness of a protective transparent layer of said optical rotating recording medium, a ratio of a defect area with respect to a beam spot area, and the above predetermined gap are values determined by the conditions defined in the following inequalities:

$$G_1 \le t \cdot \sqrt{k\pi} \times \tan\left\{\sin^{-1}\left(\frac{NA}{n}\right)\right\}$$

or $$t \ge \frac{G}{\sqrt{k\pi} \cdot \tan\left\{\sin^{-1}\left(\frac{NA}{n}\right)\right\}}$$

where

G is a gap separating accessing means from surface of optical rotating recording medium, t is a thickness of transparent layer positioned at surface of recording medium of optical rotating recording medium, n is a refractive index of transparent layer, and NA is a numerical aperture of optical system including object lens.

Namely, the present inventors found that it is sufficient to meet the inequality A or B as conditions of the protective transparent layer and gap between the accessing means and the optical rotating recording medium (or maximum permissible size of defect). A variety of optical recording/reproducing apparatuses can be designed by applying these relations. An optical recording/reproducing apparatus resulting from the above design can operate with high reliability.

Preferably, said accessing means is a head separated from said optical rotating recording medium by a flow of air caused by rotation of said optical rotating recording medium, and said predetermined gap is a gap for inflowing air between said head and said optical rotating recording medium.

More preferably, said ratio k of the defect area with respect to the beam spot area is in the range of 0.02 to 0.2.

Still more preferably, said thickness of the protective transparent layer and said gap are determined in said ratio k of the defect area with respect to the beam spot area and use is made of an optical rotating recording medium having said thickness and a head accessing said optical rotating recording medium while separated from it.

Still more preferably again, said optical rotating recording medium includes a magneto-optical disk using light and magnetism, a phase change optical disk using only light, a playback only optical disk, a compact disk, an optical hard disk, an optical floppy disk, and a video disk.

Alternatively, said accessing means is an electromagnetic actuator positioned away from said optical rotating recording medium by a predetermined gap, and said predetermined gap is a gap between said electromagnetic actuator and said optical rotating recording medium.

More preferably, said ratio k of the defect area with respect to the beam spot area is in the range of 0.02 to 0.2.

Still more preferably, said thickness of the protective transparent layer and said gap are determined in said ratio k of the defect area with respect to the beam spot area and an optical rotating recording medium having said thickness and an electromagnetic actuator positioned away from said optical rotating recording medium by said gap are used.

According to a second aspect of the present invention, there is provided an optical recording/reproducing apparatus accessing a recording layer of an optical rotating recording medium using an accessing means positioned away from a surface of said optical rotating recording medium by a predetermined gap and mounted with an object lens, wherein the distance of said accessing means from the surface of said optical rotating recording medium is made to be a value defined by the following inequality:

$$t \ge \frac{G}{\sqrt{k\pi} \cdot \tan\left\{\sin^{-1}\left(\frac{NA}{n}\right)\right\}}$$

where,

G is a gap separating accessing means from surface of optical rotating recording medium, t is a thickness of transparent layer positioned at surface of recording medium of optical rotating recording medium, n is a refractive index of transparent layer, and NA is a numerical aperture of optical system including object lens.

According to a third aspect of the present invention, there is provided an optical rotating recording medium to be used in the optical recording/reproducing apparatus accessing a recording layer of an optical rotating recording medium using an accessing means positioned away from a surface of said optical rotating recording medium by a predetermined gap and mounted with an object lens, wherein the optical rotating recording medium has a protective transparent layer of a thickness defined by the following inequality:

$$t \ge \frac{G}{\sqrt{k\pi} \cdot \tan\left\{\sin^{-1}\left(\frac{NA}{n}\right)\right\}}$$

where,

G is a gap separating accessing means from surface of optical rotating recording medium, t is a thickness of transparent layer positioned at surface of recording medium of optical rotating recording medium, n is a refractive index of transparent layer, and NA is a numerical aperture of optical system including object lens.

According to a fourth aspect of the present invention, there is provided a method of designing an optical recording/reproducing apparatus accessing a recording layer of an optical rotating recording medium using an accessing means positioned away from a surface of said optical rotating recording medium by a predetermined gap and mounted with an object lens, comprising designing said optical recording/reproducing apparatus so that a thickness of a protective transparent layer of said optical rotating recording medium, a ratio of a defect area with respect to a beam spot area, and the above predetermined gap satisfy the conditions defined by the following inequalities:

$$G_1 \leq t \cdot \sqrt{k\pi} \times \tan\left\{\sin^{-1}\left(\frac{NA}{n}\right)\right\}$$

or $$t \geq \frac{G}{\sqrt{k\pi} \cdot \tan\left\{\sin^{-1}\left(\frac{NA}{n}\right)\right\}}$$

where,

G is a gap separating accessing means from surface of optical rotating recording medium, t is a thickness of transparent layer positioned at surface of recording medium of optical rotating recording medium, n is a refractive index of transparent layer, and NA is a numerical aperture of optical system including object lens.

Further, preferably, the predetermined gap and the thickness of the protective transparent layer are determined with the ratio k of the defect area with respect to the beam spot area made 0.12.

BRIEF DESCRIPTION OF THE DRAWINGS

These and other objects and features of the present invention will become clearer from the following description of the preferred embodiments given with reference to the accompanying drawings, in which:

FIGS. 5A and 5B are views of defect models, wherein FIG. 5A is a view of circular dust and FIG. 5B is view of square dust;

FIGS. 6A and 6B are views of the area of a beam spot BS of a light beam emitted from an optical system of a pickup on the surface of the magneto-optical disk and the positional relationship of square dust;

DESCRIPTION OF THE PREFERRED EMBODIMENTS

Below, preferred embodiments will be described with reference to the accompanying drawings.

The optical rotating recording media used in the optical recording/reproducing apparatus according to the present invention include a variety of optical rotating recording media such as a magneto-optical disk (MO) using light and magnetism, a phase change optical disk using only light, a playback only optical disk, a compact disk (CD), an optical hard disk for an optical hard disk drive (optical HDD), an optical floppy disk for an optical floppy disk drive (optical FDD), a video disk for a video disk recorder (VDR), etc. They are referred to all together as magneto-optical rotating recording media in the present specification.

First Embodiment

Below, a first embodiment of an optical recording/reproducing apparatus of the present invention will be explained with reference to FIGS. 1 to 4.

Note that the term "optical recording/reproducing apparatus" used in the present specification means any of an optical recording apparatus, an optical reproducing apparatus, and an optical recording and reproducing apparatus. Here, the explanation will be given of the case of an optical recording and reproducing apparatus, specifically a magneto-optical recording and reproducing apparatus.

Figure 1:
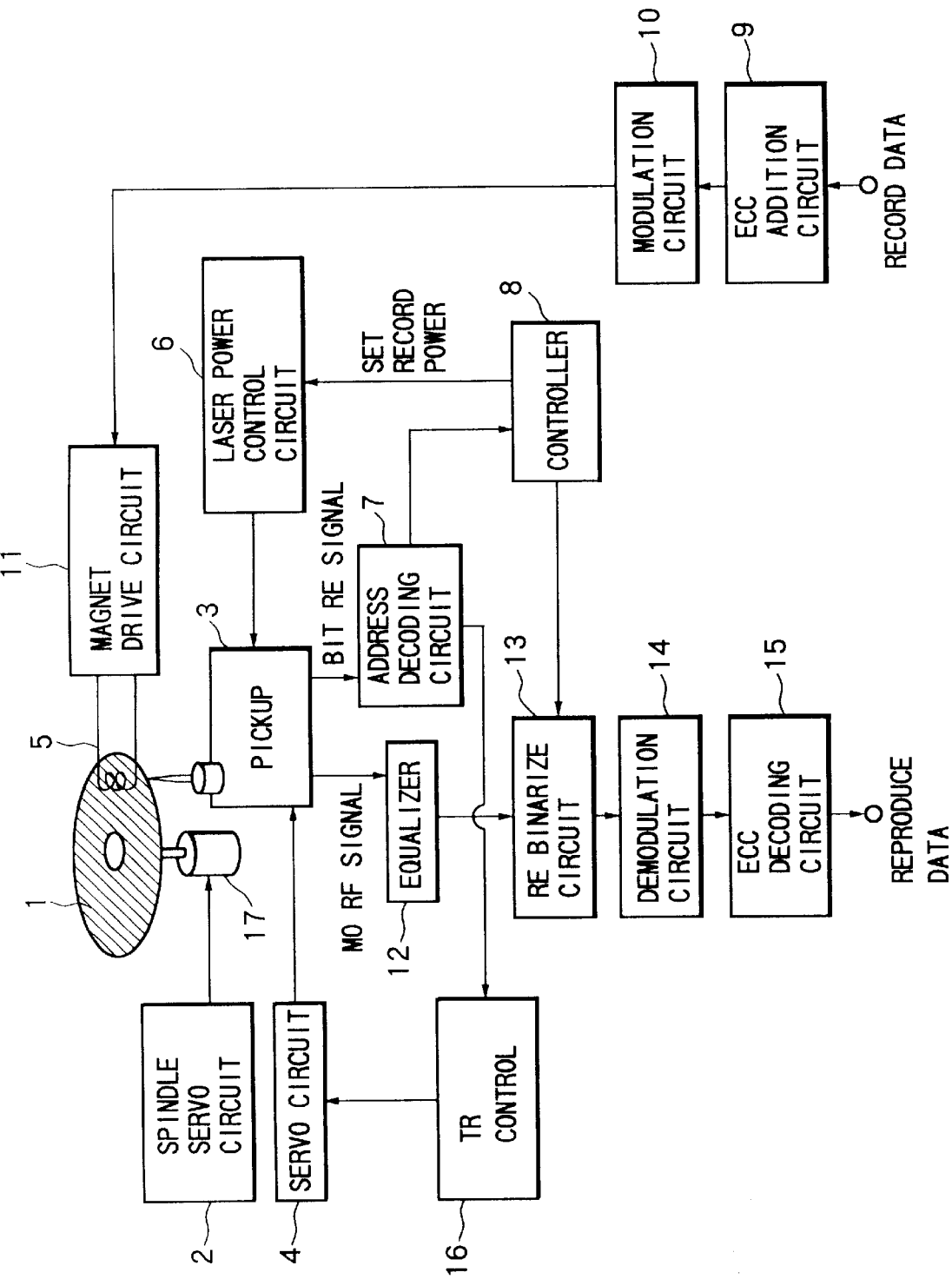
FIG. 1 is a view of the configuration of an optical recording/reproducing apparatus according to a first embodiment of the present invention.

FIG. 1 is a view of the configuration of a magneto-optical recording and reproducing apparatus according to a first embodiment of the present invention.

In the magneto-optical recording and reproducing apparatus shown in FIG. 1, the example is shown of use of a magneto-optical disk 1 as the optical rotating recording medium of the present invention and use of a flying head as the accessing means of the present invention.

In the magneto-optical recording and reproducing apparatus shown in FIG. 1, data is written on the magneto-optical disk by using the flying head, and data is read from the magneto-optical disk by using the flying head.

Figure 2:
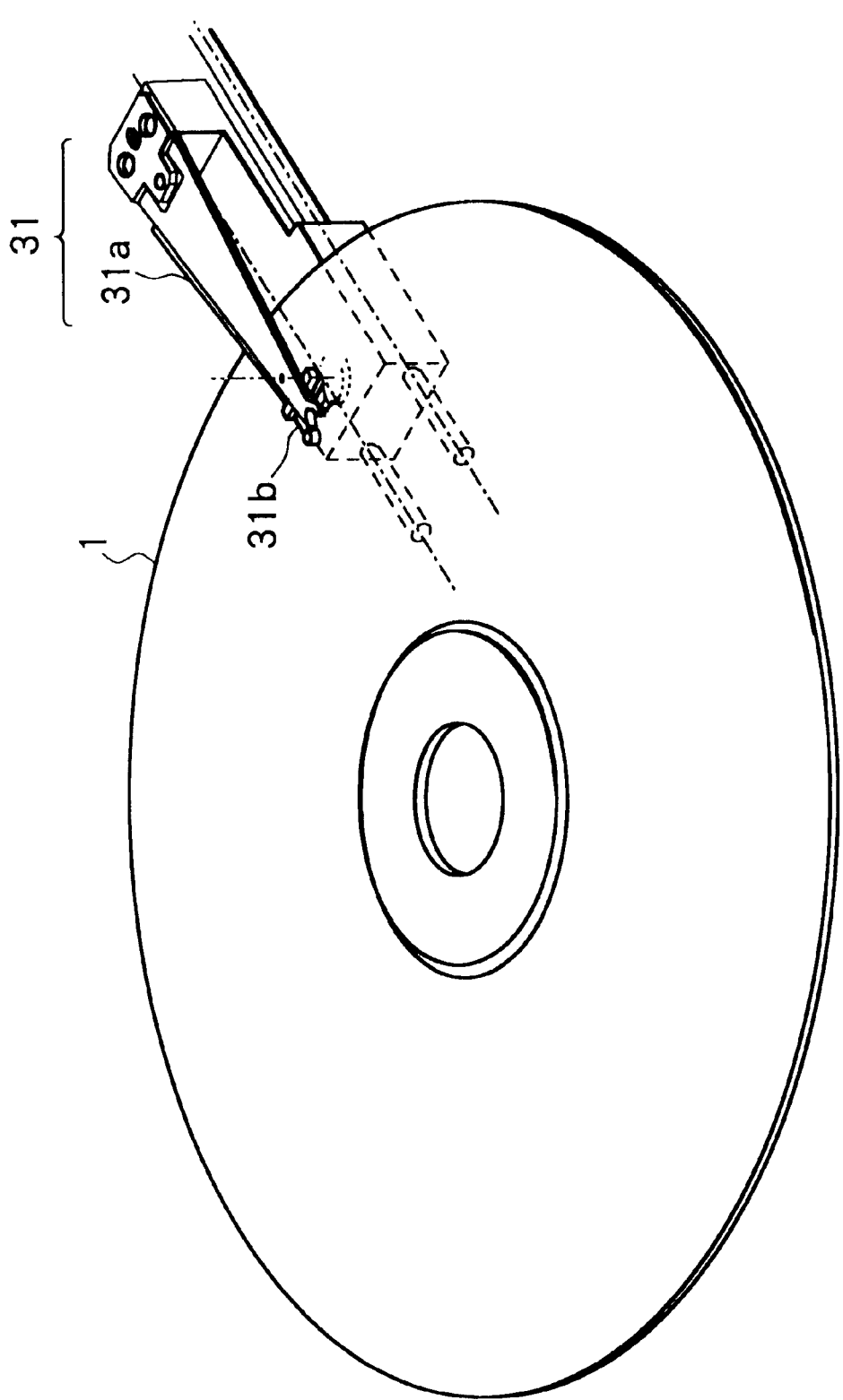
FIG. 2 is an enlarged view of a magneto-optical disk and a flying head in a pickup of the optical recording/reproducing apparatus illustrated in FIG. 1.

FIG. 2 is an enlarged view of a magneto-optical disk used in the magneto-optical recording and reproducing apparatus shown in FIG. 1 and a flying head in a pickup.

Figure 3:
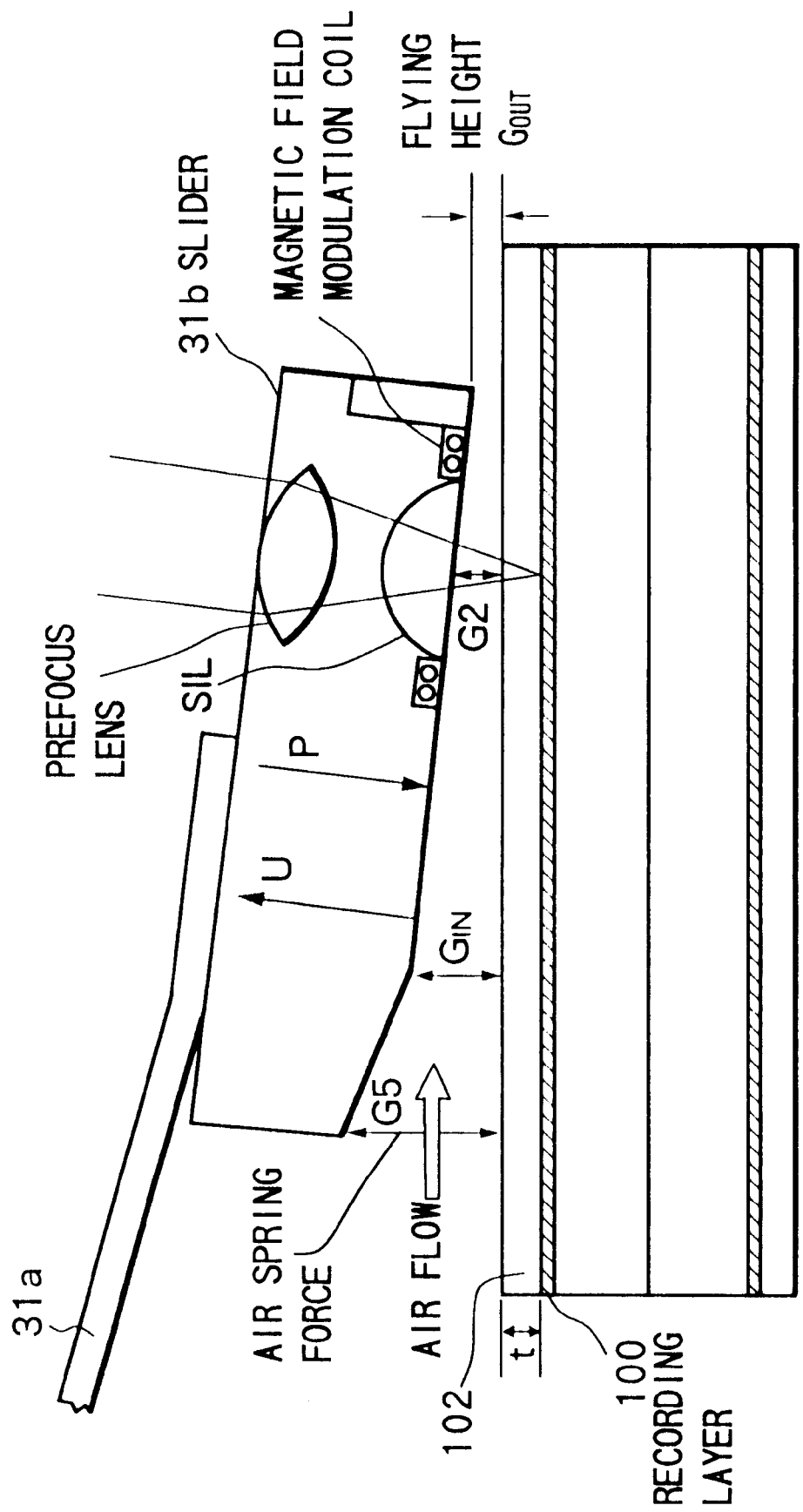
FIG. 3 is an enlarged sectional view of the magneto-optical disk and the flying head illustrated in FIG. 2.

FIG. 3 is an enlarged sectional view of the magneto-optical disk and the flying head illustrated in FIG. 2.

Figure 4:
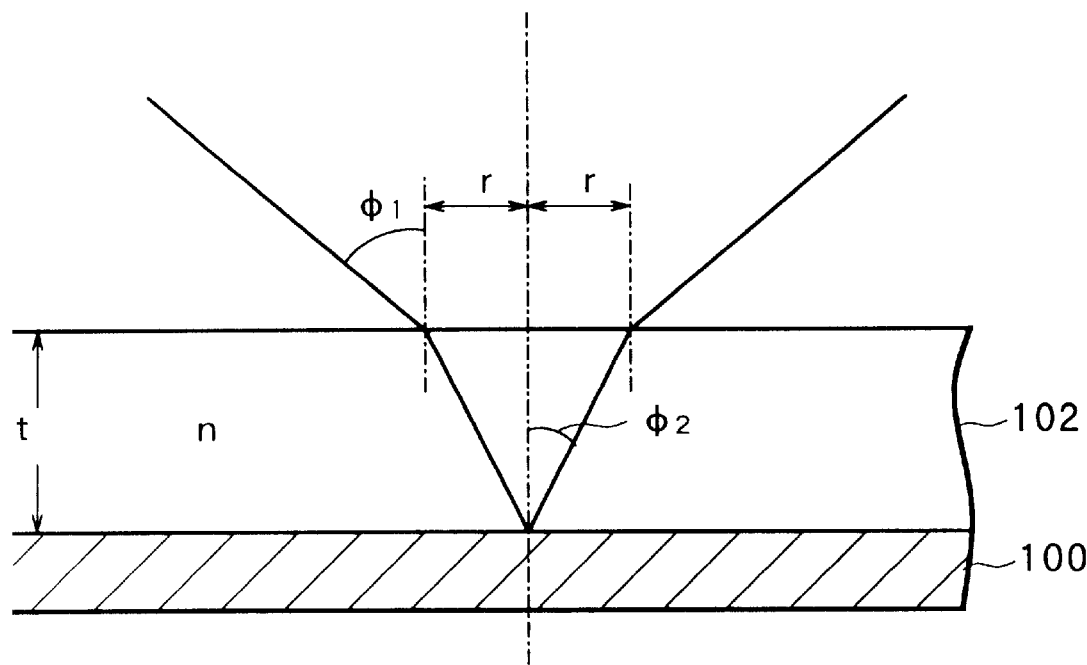
FIG. 4 is a view of a path of light emitted from an object lens mounted on the flying head on the surface of the magneto-optical disk illustrated in FIG. 2.

FIG. 4 is a view of the path of light emitted from an object lens mounted on the flying head on the recording surface of the magneto-optical disk illustrated in FIG. 3.

The magneto-optical recording and reproducing apparatus illustrated in FIG. 1 is a combination of a magneto-optical recording apparatus and a magneto-optical reproducing apparatus and comprises as common portions a spindle motor 17, a spindle servo circuit 2 for controlling the spindle motor 17, a pickup 3, a servo circuit 4, an address decoding circuit 7, a tracking control circuit 16, and a controller 8. Inside the pickup 3 are arranged the flying head 31 illustrated in FIGS. 2 and 3, a not illustrated laser diode, a beam splitter, object lens, photo detector, etc.

The spindle servo circuit 2 controls the speed of the spindle motor 17 which then turns the magneto-optical disk 1 at a predetermined speed. The tracking control circuit 16 positions the pickup 3 at a position for recording or reproduction via the servo circuit 4. The position of the pickup 3 is calculated in the address decoding circuit 7 by referring to a detection signal of the photo detector. The controller 8 manages the variety of control operations in the magneto-optical recording and reproducing apparatus.

The magneto-optical recording and reproducing apparatus further comprises as a recording system an error correction code adding circuit 9, a modulation circuit 10, a magnet drive circuit 11, an external magnetic field generation coil 5, and a laser power control circuit 6. The magneto-optical recording and reproducing apparatus comprises as a reproducing system a laser power control circuit 6, an equalizer 12, an RF signal binarizing circuit 13, a data decoding circuit 14, and a data error correction decoding circuit 15.

Note that the magnetic field generation coil 5 may be assembled in a slider as the magnetic field modulation coil shown in FIG. 3 and provided on the same side as the object lens.

Here, the explanation is given of a magneto-optical disk as an example of the optical rotating recording medium of the present invention. As a specific example of such a magneto-optical disk 1, the above super compact magneto-optical disk capable of both recording and reproduction, that is, a super compact high density large capacity magneto-optical disk having a diameter of about 25 mm to 64 mm, a refractive index n of 405 nm, a numerical aperture of about 0.9, and a storage capacity of 2 GB on one side, can be used.

When using such a super compact magneto-optical disk 1, a blue color light emitting laser diode having a short wavelength is used as the laser diode. Accordingly, the numerical aperture of a not shown object lens mounted on the pickup 3 is high. Therefore, such an optical recording/reproducing apparatus is susceptible to dust and other defects.

The magneto-optical recording and reproducing apparatus shown in FIG. 1 comprises a tracking control circuit 16, but the focus control circuit is not shown. Namely, in the present embodiment, the explanation is given of the case where the pickup 3 is a flying head type having a flying head 31 shown in FIGS. 2 and 3 and a slider portion 31b mounted on a not shown object lens floats at a predetermined distance from the magneto-optical disk 1 by air pressure caused by the rotation of the magneto-optical disk 1 by the spindle motor 17 and focus control is not necessary.

The flying head 31 will be explained in detail next.

As shown in FIG. 3, the flying head 31 comprises a suspension 31a and a slider 31b supported by the suspension 31a. The flow of air resulting from the rotation of the magneto-optical disk 1 by the spindle motor 17 enters between the slider 31b and the magneto-optical disk 1 to generate a floating force U indicated by a solid line in FIG. 3 at the flying head 31. On the other hand, a spring force (elastic force) D of the suspension 31a acts toward the magneto-optical disk 1. The flying head 31 floats from the magneto-optical disk 1 at a position where the floating force U and the downward spring force D are balanced.

The float differs at the inlet portion and outlet portion of the air. Namely, in the flying head 31, an inflow gap $G_{IN}$ arises at the inlet portion where the air enters and an outflow gap $G_{OUT}$ arises at the outlet portion from which the air is discharged. The inflow gap $G_{IN}$ and the outflow gap $G_{OUT}$ are different.

In the present embodiment, the explanation is given of the case where the space around the magneto-optical disk 1 and the flying head is filled with air, but the space around them does not have to be filled with air. Other gases, such as an inert gas like argon, may be filled. In an inert gas environment, due to the flow of gas caused by the rotation of the magneto-optical disk 1, the slider portion 31b of the flying head 31 floats from the surface of the magneto-optical disk 1.

In the following explanation, the explanation will be given of the case where air is filled around the magneto-optical disk 1 and the flying head 31.

The magneto-optical disk 1 comprises a substrate 100 and a transparent cover coat (protective cover coat transparent layer) 102 formed on the substrate 100 to protect the same. Other portions of the magneto-optical disk 1 are omitted in the drawing.

As shown in FIG. 4, light from the object lens mounted on the flying head 31 passes through the protective cover coat transparent layer 102 and is focused on the recording surface of the substrate 100.

The external magnetic field generation coil 5 is positioned on an extension of the laser beam emitted from the object lens of the pickup 3. The output of the laser diode differs when recording data and reproducing data. The power is controlled by the laser power control circuit 6.

The pickup 3 reads PITRF address information stored as pits of topology of the substrate 100 of the magneto-optical disk 1 as a light intensity signal and decodes the read signal in the address decoding circuit 7. Namely, the address decoding circuit 7 decodes track address information etc. of the magneto-optical disk 1 and sends the position and the address information to the controller 8 and the tracking control circuit 16. The controller 8 refers to the information to control the recording of data and reproduction of data, while the tracking control circuit 16 controls the position of the pickup 3.

The ordinary recording operation of data in the magneto-optical recording and reproducing apparatus will be explained next. At the time of a data recording operation, the controller 8 activates the tracking control circuit 16. The tracking control circuit 16 controls the servo circuit 14 to position the pickup 3 at a data recording position. When data to be recorded is input to the error correction code adding circuit 9, the error correction code adding circuit 9 adds an error correction code to the data to be recorded. The data to be recorded added with the error correction code is modulated in the modulation circuit 10. The modulation in the modulation circuit 10 is performed suitably in accordance with the type of the magneto-optical disk 1 etc. For example 16/17 conversion is performed on the magneto-optical disk 1. Of course, other modulation systems, for example, EFM plus modulation, can be performed with a digital versatile disk (DVD). A magnet drive circuit 11 drives the external magnetic field generation coil 5 so that a magnetic field of positive/negative polarities is generated on the recording surface of the magneto-optical disk 1 in accordance with the polarity of the data to be recorded modulated in the modulation circuit 10, that is, "1" or "0". At this time, the controller 8 instructs the laser power control circuit 6 to set the laser diode in the pickup 3 to a high output drivable state capable of recording data, the laser diode in the pickup 3 is driven at a high output state, and a recording mark in accordance with the polarity of the magnetic field by the external magnetic field generating coil 5 is formed on the recording film of the magneto-optical disk 1 by the high output laser diode beam.

An ordinary data reproducing operation in the magneto-optical recording and reproducing apparatus will be explained next. During a data reproducing operation, the controller 8 activates the tracking control circuit 16. The tracking control circuit 16 controls the servo circuit 4 to position the pickup 3 at a data reproducing position. An RF signal of a magneto-optical signal (MO signal) recorded on the magneto-optical disk 1 is generated by a detector in the pickup 3 and input to an equalizer 12 where it is subjected to waveform shaping (equalized). The output signal of the equalizer 12 is binarized in the RF signal binarizing circuit 13 and identified as a digital signal "1" or "0". The data demodulating circuit 14 performs reverse processing from that of the modulation circuit 10, that is, demodulation. The data error correction decoding circuit 15 corrects error when there is error in the demodulated digital signal. Data reproduced in this way is sent to an external apparatus, for example, a host computer.

In the above recording operation or reproducing operation of the magneto-optical recording and reproducing apparatus, dust of a size than the inflow gap $G_{IN}$ shown in FIG. 3 is flicked away from the protective cover coat transparent layer 102 and the tip of the flying head 31 and does not enter between the flying head 31 and the magneto-optical disk 1. Accordingly, defects such as dust of a larger size than the inflow gap $G_{IN}$, are not covered when considering reliability in the present invention. The dust and other defects considered in the present embodiment are smaller than the inflow gap $G_{IN}$ and larger than the outflow gap $G_{OUT}$, so remain between the magneto-optical disk 1 and the flying head, particularly enter into the light path of the optical system installed in the flying head and have an effect on the writing of data on the magneto-optical disk 1 or on the reading of data from the magneto-optical disk 1.

Definition of Defects

Here, the dust and other defects causing error will be considered. Deposition of defects on the surface of the protective cover coat transparent layer 102 of the magneto-optical disk 1 results in loss of data (information) recorded on the magneto-optical disk 1 at the time of a read operation. Thus, we will consider the maximum permissible dimensions of a defect, that is, dimensions of a defect not causing a read error.

Figure 5A:
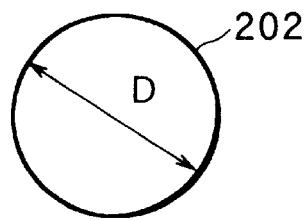
Figure 5B:
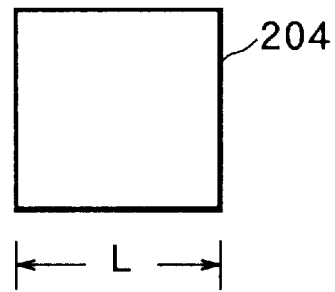

Here, we will simplify the models of the above defect and consider circular dust 202 having a diameter D illustrated in FIG. 5A and the square dust 204 having a side length L illustrated in FIG. 5B.

Dust usually has three-dimensional dimensions, but since we are considering the dimensions of dust affecting the beam spot on the surface of a magneto-optical disk 1, we will consider only the area occupied on the surface of the magneto-optical disk 1 as the dimensions of the dust.

The surface area Si of spherical dust 202 is $\pi(D/2)^2$. The surface area S2 of the square dust 204 is $L^2$.

To simplify the models to treat circular dust 202 and box-shaped dust 204 in the same way, we will assume that S1=S2, that is, $L^2=\pi(D/2)^2$. Namely, in the present specification, we will treat circular dust in the same way as square dust having a side length L equivalently meeting equation $L^2=\pi(D/2)^2$ and will treat square dust in the same way as circular dust having a diameter D equivalently meeting equation $L^2=\pi(D/2)^2$.

Below, the case where the dust is square dust will be described.

FIGS. 6A and 6B are views of the area of a beam spot BS on the surface of the magneto-optical disk 1 resulting from a light beam emitted from the optical system of the pickup 3 and the positional relationship of the square dust 204.

FIGS. 6A and 6B show that when assuming that square dust 204 having a side length L is deposited on the surface of the protective cover coat transparent layer 102 of the magneto-optical disk 1, the beam spot BS moves from the position in FIG. 6A to the position in FIG. 6B due to the rotation of the magneto-optical disk 1.

In order to determine the conditions enabling data to be normally read from the magneto-optical disk 1 without error correction in the above error correction code decoding circuit 15, use is made of a ratio k of the area $L^2$ of a defect with respect to a beam spot area BS, that is, a "defect area/beam spot area" ratio k of formula (1), as an indicator of the maximum dimensions (maximum area) of the square dust 204.

$$k = \frac{L^2}{BS} \quad (1)$$

where, k: defect area/beam spot area

L: length of one side of square dust

BS: beam spot area

The beam spot BS will be explained next.

FIG. 4 is a view of the path of a beam of light in the protective cover coat transparent layer 102 of the magneto-optical disk 1.

A beam striking the protective cover coat transparent layer 102 having a thickness t and a refractive index n is focused on the recording surface of the substrate 100. The beam strikes the surface of the protective cover coat transparent layer 102 at an incident angle $\phi1$, is refracted in the protective cover coat transparent layer 102, and strikes the recording surface of the substrate 100 at an incident angle $\phi2$. In this case, the conditions in equations (2) to (4) stands:

$$NA = \sin\phi_2 = n \sin\phi_1 \quad (2)$$

$$r = \tan\phi_1 = t \cdot \tan(\sin)^{-1}\left(\frac{NA}{n}\right) \quad (3)$$

$$BS = \pi r^2 \quad (4)$$

where,

NA: numerical aperture of object lens $\phi1$: incident angle on protective cover coat $\phi2$: incident angle on recording surface r: radius of beam spot t: thickness of protective cover coat n: refraction index of protective cover coat BS: beam spot area.

That is, "NA" indicates the numerical aperture of the object lens mounted on the pickup 3, "r" indicates the radius of the beam spot BS on the protective cover coat transparent layer 102, and "BS" indicates the area of the beam spot BS on the protective cover coat transparent layer 102.

Here, consider the relationship between the inflow gap $G_{IN}$ and the thickness of the protective cover coat transparent layer 102. Equation (1) can be modified to $(G_{IN})^2 = K \cdot BS$, so when entering equations (3) and (4) to develop it, the following equation (5) can be obtained:

$$G_{IN} = \sqrt{k \cdot BS} \quad (5)$$
$$= \sqrt{k \cdot \pi r^2}$$
$$= \sqrt{k \cdot \pi} \times t \times \tan\left(\sin^{-1}\left(\frac{NA}{n}\right)\right)$$

The following inequalities (6) and (7) can be obtained from equation (5):

$$G_{IN} \leq \sqrt{k \cdot \pi} \times t \times \tan\left\{\sin^{-1}\left(\frac{NA}{n}\right)\right\} \quad (6)$$

$$t \geq \frac{G_{IN}}{\sqrt{k \cdot \pi} \cdot \tan\left\{\sin^{-1}\left(\frac{NA}{n}\right)\right\}} \quad (7)$$

Inequality (6) is a conditional inequality for obtaining the value of the inflow gap $G_{IN}$ which prevents error, while inequality (7) is a conditional inequality for obtaining the thickness t of the protective cover coat transparent layer 102 which prevents error.

Note that, as explained above, this assumes that dust and other defects of dimensions larger than the inflow gap $G_{IN}$ of the flying head 31 to the surface of the protective cover coat transparent layer 102 do not enter the beam spot BS.

In this way, the research of the present inventors showed that conditions may be set to prevent error due to defects based on the inflow gap $G_{IN}$, the defect area/beam spot area ratio k, the thickness t of the protective cover coat transparent layer 102, the numerical aperture NA, and the refractive index n of the protective cover coat transparent layer 102.

An optical recording/reproducing apparatus capable of preventing error due to defects can be designed based on inequalities (6) and (7).

Furthermore, an optical recording/reproducing apparatus designed in this way can be produced for practical use.

The refractive index n of the protective cover coat transparent layer 102 in inequalities (6) and (7) is determined by the material of the transparent layer 102. The numerical aperture NA of the object lens is determined in accordance with the wavelength of the laser diode used. Accordingly, the design conditions in inequalities (6) and (7) are determined by generally considering the interrelationship of the defect area/beam spot area ratio k, the thickness t of the protective cover coat transparent layer 102, and the inflow gap $G_{IN}$.

Note that an appropriate value of the defect area/beam spot area ratio k is, as will be explained later on, determined for the recording/reproducing system. Accordingly, it is learned that the condition for not allowing a defect to cause error is determined by the interrelationship of the thickness t of the protective cover coat transparent layer 102 and the inflow gap $G_{IN}$.

Experiment

Next, results of experiments conducted based on specific conditions of inequalities (6) or (7) will be explained.

In the experiments, the following four types of artificial defects (dust) were deposited on the surface of cover glass of the magneto-optical disk 1 to evaluate the thickness t of the following protective cover coat transparent layer 102.

Experimental Conditions (Experimental Parameters)

Thickness t of protective cover coat transparent layer 102=0.15 mm, 0.20 mm

Dimensions of artificial defects (dust): Square dust,

L=10 μm, 30 μm

L=70 μm, 100 μm

Experimental Results

Figure 7:
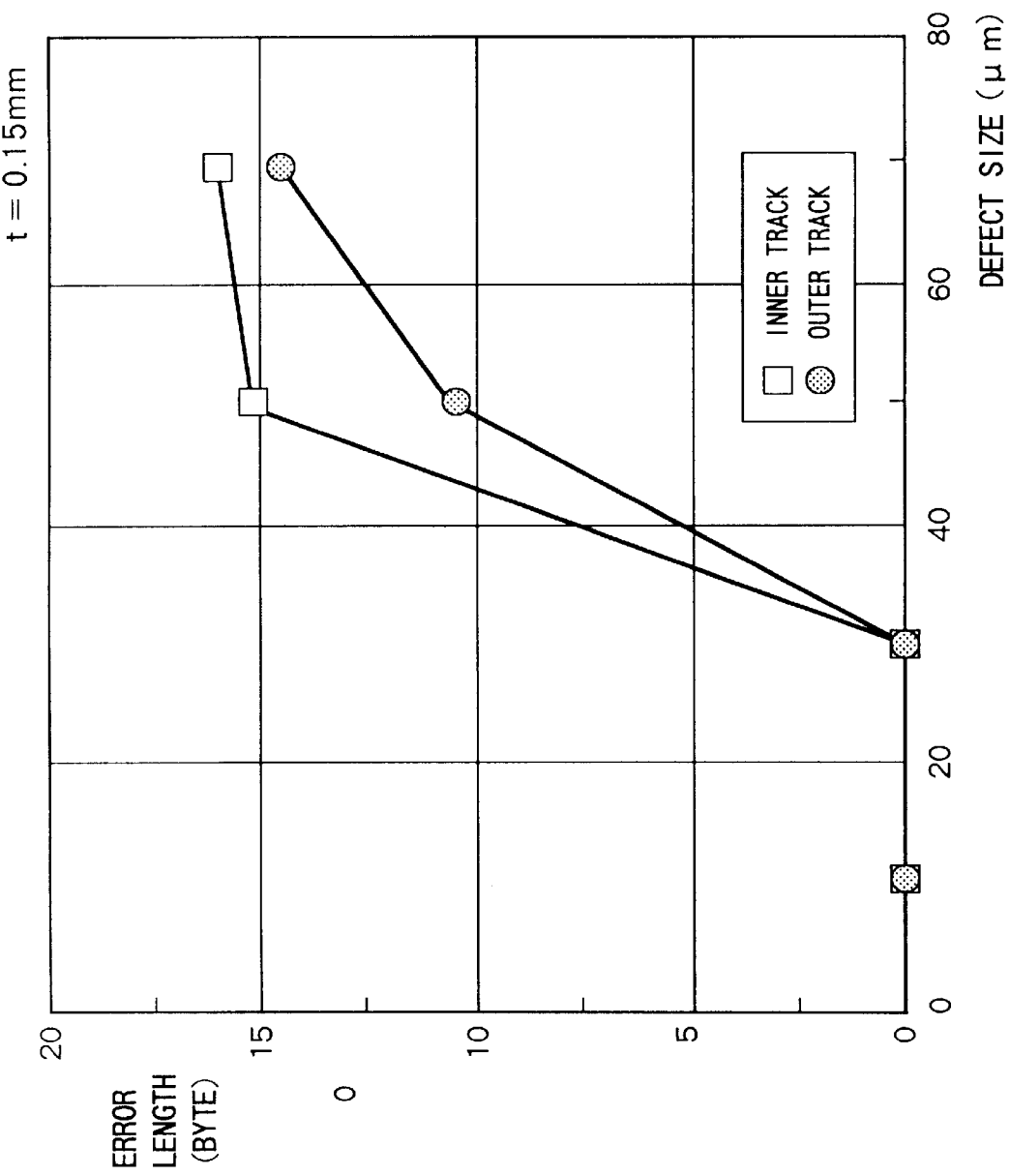
FIG. 7 is a graph of the dependency of an error length on a defect with respect to a defect when the thickness of the protective cover coat transparent layer t is 0.15 mm.

FIG. 7 is a graph of the dependency of an error length on a defect with respect to a defect when the thickness of the protective cover coat transparent layer t is 0.15 mm.

Figure 8:
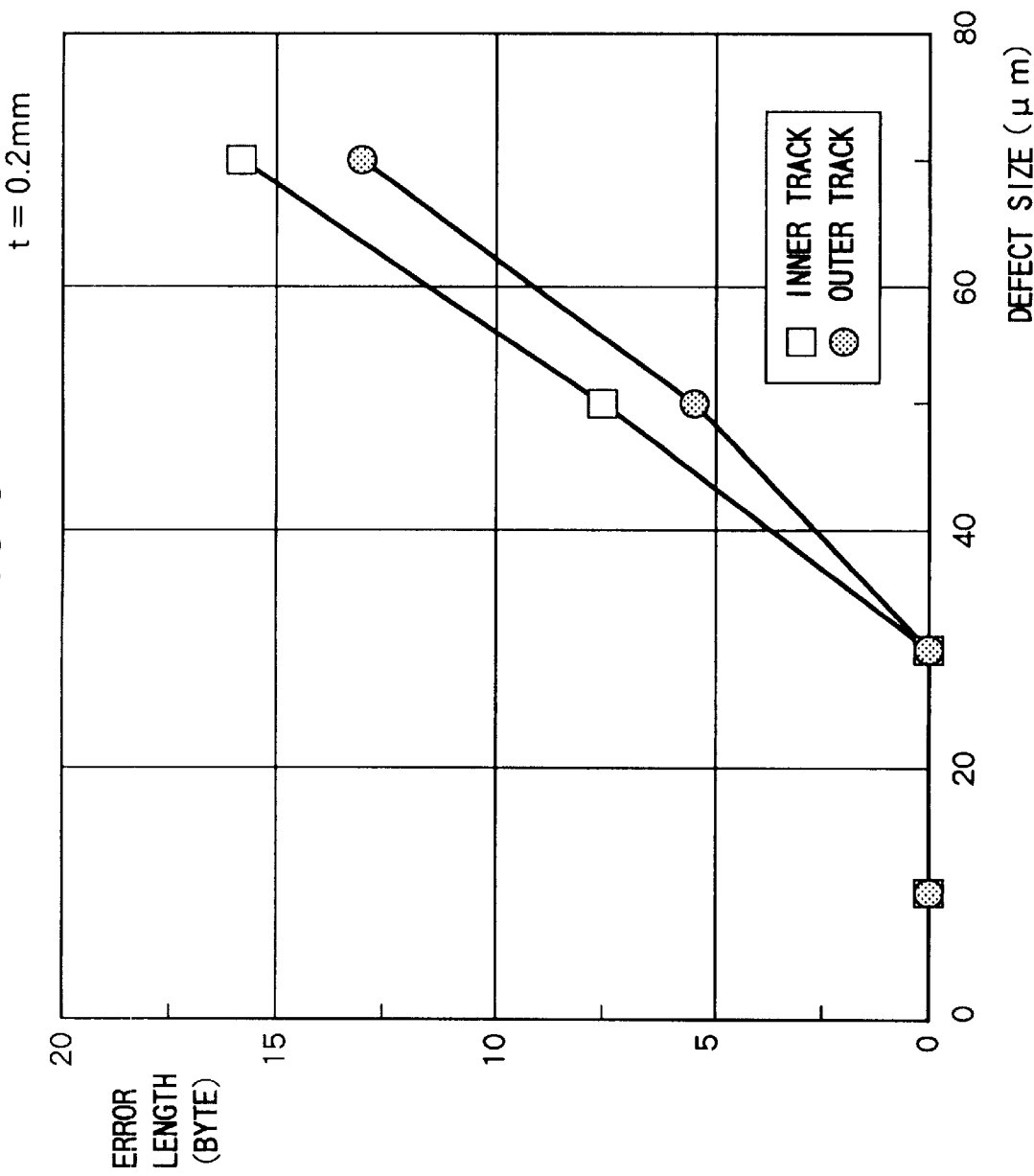
FIG. 8 is a graph of the dependency of an error length on a defect with respect to a defect when the thickness of the protective cover coat transparent layer t is 0.20 mm.

FIG. 8 is a graph of the dependency of an error length on a defect with respect to a defect when the thickness of the protective cover coat transparent layer t is 0.20 mm;

In FIGS. 7 and 8, the abscissa indicates the dimensions of the defect, while the ordinate indicates the error length. The error length includes not only continuous error, but also the total number of bytes in a segment including defects.

The effects of a defect appearing in a signal waveform appear as a decline of the reflectance. The reflectance normally becomes large at the center of the portion where the effects of the defect appear.

From these results, with a magneto-optical disk 1 having a thickness t of the protective cover coat transparent layer 102 of 0.15 mm, no error arose due to an artificial defect having a side length L of 30 μm. However, an artificial defect having a side length L of 50 μm caused an error.

Figure 9:
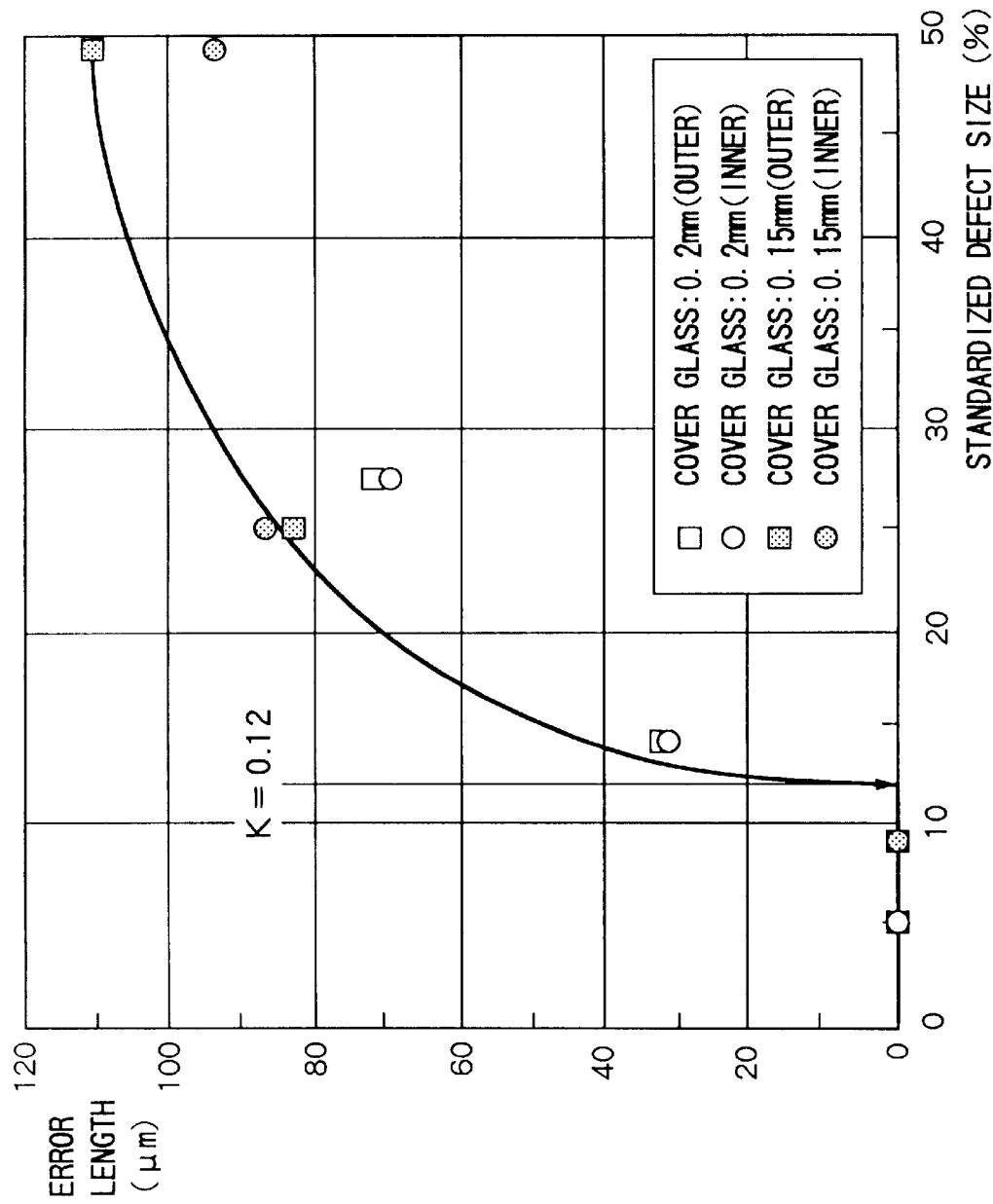
FIG. 9 is a graph of a result of normalization of the results illustrated in FIGS. 7 and 8.

FIG. 9 is a graph of results of normalization of the results shown in FIGS. 7 and 8. In FIG. 9, the abscissa indicates the defect area/beam spot area ratio k (%), while the ordinate indicates a physical error length on the magneto-optical disk 1 obtained by multiplying the error length with the bit size at the position. Note that correction was made by the thickness t of the protective cover coat transparent layer 102.

The float of the flying head 31 from the magneto-optical disk 1, particularly the inflow gap $G_{IN}$, changes in accordance with the magnitude of the air flow, which changes depending on the peripheral speed of the magneto-optical disk 1. Accordingly, the inflow gap $G_{IN}$ near the rim becomes larger than that at the inner circumference of the magneto-optical disk 1 in a constant linear velocity (CLV) mode.

In the results shown in FIG. 9, the error length at the inner circumference and that at the outer circumference on the magneto-optical disk 1 are almost the same. Accordingly, when configuring an optical recording/reproducing apparatus by determining the thickness t of the protective cover coat transparent layer 102 and the inflow gap $G_{IN}$ based on the above conditional inequalities (6) and (7), a stable optical recording/reproducing apparatus having little positional dependency in the radial direction of the magneto-optical disk 1 can be realized.

The largest defect not causing error without ECC, when expressed using the area ratio with the beam spot BS, that is, the defect area/beam spot area ratio k, was 12% (k=0.12) in the present experimental system. Namely, it was found that the appropriate defect area/beam spot area ratio k was 0.12 when the thickness t of the protective cover coat transparent layer 102 was 0.15 or 0.2 mm.

Of course, since the magneto-optical recording and reproducing apparatus shown in FIG. 1 comprises an ECC decoding circuit 15, the effects of defects can be considerably eliminated by ECC decoding.

Note that the optimal value of the defect area/beam spot area ratio k given above, that is, k=0.12, is a value of the present experimental system calculated from values when the thickness t of the protective cover coat transparent layer 102 is 0.15 mm and 0.2 mm. The defect area/beam spot area ratio k may be made a different value in a magnetic disk system having a different recording density or using a different data detection method.

For example, the defect area/beam spot area ratio k may be made 0.02 to 0.2, that is, centered around the above 0.12. Note that k=0.08 in the case of a video disk for a video disk recorder (VDR). The value of k decreases as the density increases.

Table 1 shows the results of trial calculation of the thickness t of the protective cover coat transparent layer 102 when the numerical aperture NA is 0.53 and 0.6 and the dimensions of the defect, in other words, the size of the inflow gap $G_{IN}$, when the defect area/beam spot area ratio k is 0.12 and the refractive index n of the protective cover coat transparent layer 102 is 1.51.

TABLE 1

| Cover glass thickness t (mm) | Maximum defect size $G_{IN}$ (μm) | |
|---|---|---|
| | NA = 0.53 | NA = 0.6 |
| 0.15 | 35 | 40 |
| 0.2 | 46 | 53 |
| 0.3 | 69 | 80 |
| 0.6 | 138 | 160 |
| 1.2 | 276 | 319 | k = 0.12

As explained above, it was learned from the values in Table 1 that when the thickness t of the protective cover coat transparent layer 102 becomes larger, the permissible maximum defect dimensions (inflow gap $G_{IN}$) become larger. Furthermore, from the values in Table 1, t was learned that when the numerical aperture increases from 0.53 to 0.6, the permissible maximum defect dimensions (inflow gap $G_{IN}$) become larger.

Even when the thickness t of the protective cover coat transparent layer 102 is reduced to about 0.2 mm and 0.15 mm, the maximum value of the defect dimensions (inflow gap $G_{IN}$) which does not cause a read error due to dust and other defect is found in the same way.

For example, in the case of a magneto-optical disk 1 having a thickness t of the protective cover coat transparent layer 102 of 0.3 mm, even when the numerical aperture NA is 0.53 or 0.6, no error occurs due to a square defect having a side length L of not more than 69 μm.

Next, Tables 2 to 9 show the results of calculation of the thickness t (mm) of the protective cover coat transparent layer 102 when the refractive index of the protective cover coat transparent layer 102 is 1.51, the numerical aperture NA is changed to 0.5, 0.6, 0.7, 0.8, 0.85, 0.9, and 0.95, the dimensions of the defect (inflow gap $G_{IN}$) is changed to 0.05, 0.1, 0.2, 0.5, 1, 5, and 100 μm. and the defect area/beam spot area ratio k is changed to 0.12, 0.1, 0.08, 0.06, 0.04, 0.16, 0.2, and 0.02.

TABLE 2

| K = 0.12 | 0.12 | 100 μm<br>100 | 5 μm<br>5 | 1 μm<br>1 | 500 nm<br>0.5 | 200 nm<br>0.2 | 100 nm<br>0.1 | 50 nm<br>0.05 |
|---|---|---|---|---|---|---|---|---|
| NA = 0.95 | 0.95 | 201.2206 | 10.06103 | 2.012206 | 1.006103 | 0.402111 | 0.201221 | 0.10061 |
| NA = 0.9 | 0.9 | 219.4145 | 10.97073 | 2.194145 | 1.097073 | 0.438829 | 0.219415 | 0.109707 |
| NA = 0.85 | 0.85 | 239.1352 | 11.95676 | 2.391352 | 1.195676 | 0.47827 | 0.239135 | 0.119568 |
| NA = 0.80 | 0.8 | 260.7232 | 13.03616 | 2.607232 | 1.303616 | 0.521446 | 0.260723 | 0.130362 |
| NA = 0.7 | 0.7 | 311.2971 | 15.56485 | 3.112971 | 1.556485 | 0.622594 | 0.311297 | 0.155649 |
| NA = 0.6 | 0.6 | 376.1362 | 18.80881 | 3.761362 | 1.880881 | 0.752272 | 0.376136 | 0.188088 |
| NA = 0.5 | 0.5 | 464.1124 | 23.20562 | 4.641124 | 2.320562 | 0.928225 | 0.464112 | 0.232056 |

TABLE 3

| K = 0.10 | 0.1 | 100 μm<br>100 | 5 μm<br>5 | 1 μm<br>1 | 500 nm<br>0.5 | 200 nm<br>0.2 | 100 nm<br>0.1 | 50 nm<br>0.05 |
|---|---|---|---|---|---|---|---|---|
| NA = 0.95 | 0.95 | 220.4261 | 11.02131 | 2.204261 | 1.102131 | 0.440852 | 0.220426 | 0.110213 |
| NA = 0.9 | 0.9 | 240.3566 | 12.01783 | 2.403566 | 1.201783 | 0.480713 | 0.240357 | 0.120178 |
| NA = 0.85 | 0.85 | 261.9595 | 13.09797 | 2.619595 | 1.309797 | 0.523919 | 0.261959 | 0.13098 |
| NA = 0.80 | 0.8 | 285.6079 | 14.2804 | 2.856079 | 1.42804 | 0.571216 | 0.285608 | 0.142804 |
| NA = 0.7 | 0.7 | 341.0089 | 17.05044 | 3.410089 | 1.705044 | 0.682018 | 0.341009 | 0.170504 |
| NA = 0.6 | 0.6 | 412.0365 | 20.60183 | 4.120365 | 2.060183 | 0.824073 | 0.412037 | 0.206018 |
| NA = 0.5 | 0.5 | 508.4096 | 25.12048 | 5.084096 | 2.542048 | 1.016819 | 0.50841 | 0.254205 |

TABLE 4

| K = 0.08 | 0.08 | 100 μm<br>100 | 5 μm<br>5 | 1 μm<br>1 | 500 nm<br>0.5 | 200 nm<br>0.2 | 100 nm<br>0.1 | 50 nm<br>0.05 |
|---|---|---|---|---|---|---|---|---|
| NA = 0.95 | 0.95 | 246.4439 | 12.32219 | 2.464439 | 1.232219 | 0.492888 | 0.246444 | 0.123222 |
| NA = 0.9 | 0.9 | 268.7268 | 13.43634 | 2.687268 | 1.343634 | 0.537454 | 0.268727 | 0.134363 |
| NA = 0.85 | 0.85 | 292.8796 | 14.64398 | 2.928796 | 1.464398 | 0.585759 | 0.29288 | 0.14644 |
| NA = 0.80 | 0.8 | 319.3194 | 15.96597 | 3.193194 | 1.596597 | 0.638639 | 0.319319 | 0.15966 |
| NA = 0.7 | 0.7 | 381.2595 | 19.06298 | 3.812595 | 1.906298 | 0.762519 | 0.38126 | 0.19063 |
| NA = 0.6 | 0.6 | 460.6709 | 23.03354 | 4.606709 | 2.303354 | 0.921342 | 0.460671 | 0.230335 |
| NA = 0.5 | 0.5 | 568.4193 | 28.42096 | 5.684193 | 2.842096 | 1.136839 | 0.568419 | 0.28421 |

TABLE 5

| K = 0.06 | 0.06 | 100 μm<br>100 | 5 μm<br>5 | 1 μm<br>1 | 500 nm<br>0.5 | 200 nm<br>0.2 | 100 nm<br>0.1 | 50 nm<br>0.05 |
|---|---|---|---|---|---|---|---|---|
| NA = 0.95 | 0.95 | 284.5689 | 14.22844 | 2.845689 | 1.422844 | 0.569138 | 0.284569 | 0.142284 |
| NA = 0.9 | 0.9 | 310.299 | 15.51495 | 3.10299 | 1.551495 | 0.620598 | 0.310299 | 0.155149 |
| NA = 0.85 | 0.85 | 338.1882 | 16.90941 | 3.381882 | 1.690941 | 0.676376 | 0.338188 | 0.169094 |
| NA = 0.80 | 0.8 | 368.7182 | 18.43591 | 3.687182 | 1.843591 | 0.737436 | 0.368718 | 0.184359 |

TABLE 5-continued

| K = 0.06 | 0.06 | 100 μm<br>100 | 5 μm<br>5 | 1 μm<br>1 | 500 nm<br>0.5 | 200 nm<br>0.2 | 100 nm<br>0.1 | 50 nm<br>0.05 |
|---|---|---|---|---|---|---|---|---|
| NA = 0.7 | 0.7 | 440.2406 | 22.01203 | 4.402406 | 2.201203 | 0.880481 | 0.440241 | 0.22012 |
| NA = 0.6 | 0.6 | 531.9369 | 26.59684 | 5.319369 | 2.659684 | 1.063874 | 0.531937 | 0.265968 |
| NA = 0.5 | 0.5 | 656.354 | 32.8177 | 6.56354 | 3.28177 | 1.312708 | 0.656354 | 0.328177 |

TABLE 6

| K = 0.04 | 0.04 | 100 μm<br>100 | 5 μm<br>5 | 1 μm<br>1 | 500 nm<br>0.5 | 200 nm<br>0.2 | 100 nm<br>0.1 | 50 nm<br>0.05 |
|---|---|---|---|---|---|---|---|---|
| NA = 0.95 | 0.95 | 348.5243 | 17.42621 | 3.485243 | 1.742621 | 0.697049 | 0.348524 | 0.174262 |
| NA = 0.9 | 0.9 | 380.0371 | 19.00186 | 3.800371 | 1.900186 | 0.760074 | 0.380037 | 0.190019 |
| NA = 0.85 | 0.85 | 414.1943 | 20.70971 | 4.141943 | 2.070971 | 0.828389 | 0.414194 | 0.207097 |
| NA = 0.80 | 0.8 | 451.5858 | 22.57929 | 4.515858 | 2.257929 | 0.903172 | 0.451586 | 0.225793 |
| NA = 0.7 | 0.7 | 539.1824 | 26.95912 | 5.391824 | 2.695912 | 1.078365 | 0.539182 | 0.269591 |
| NA = 0.6 | 0.6 | 651.487 | 32.57435 | 6.51487 | 3.257435 | 1.302974 | 0.651487 | 0.325743 |
| NA = 0.5 | 0.5 | 803.8662 | 40.19331 | 8.038662 | 4.019331 | 1.607732 | 0.803866 | 0.401933 |

TABLE 7

| K = 0.16 | 0.16 | 100 μm<br>100 | 5 μm<br>5 | 1 μm<br>1 | 500 nm<br>0.5 | 200 nm<br>0.2 | 100 nm<br>0.1 | 50 nm<br>0.05 |
|---|---|---|---|---|---|---|---|---|
| NA = 0.95 | 0.95 | 174.2621 | 8.713107 | 1.742621 | 0.871311 | 0.348524 | 0.174262 | 0.087131 |
| NA = 0.9 | 0.9 | 190.0186 | 9.500928 | 1.900186 | 0.950093 | 0.380037 | 0.190019 | 0.095009 |
| NA = 0.85 | 0.85 | 207.0971 | 10.35186 | 2.070971 | 1.035186 | 0.414194 | 0.207097 | 0.103549 |
| NA = 0.80 | 0.8 | 225.7929 | 11.28964 | 2.257929 | 1.128964 | 0.451586 | 0.225793 | 0.112896 |
| NA = 0.7 | 0.7 | 269.5912 | 13.17956 | 2.695912 | 1.347956 | 0.539182 | 0.269591 | 0.134796 |
| NA = 0.6 | 0.6 | 325.7435 | 16.28717 | 3.257435 | 1.628717 | 0.651487 | 0.325743 | 0.162872 |
| NA = 0.5 | 0.5 | 401.9331 | 20.09666 | 4.019331 | 2.009666 | 0.803866 | 0.401933 | 0.200967 |

TABLE 8

| K = 0.2 | 0.2 | 100 μm<br>100 | 5 μm<br>5 | 1 μm<br>1 | 500 nm<br>0.5 | 200 nm<br>0.2 | 100 nm<br>0.1 | 50 nm<br>0.05 |
|---|---|---|---|---|---|---|---|---|
| NA = 0.95 | 0.95 | 155.8648 | 7.79324 | 1.558648 | 0.779324 | 0.31173 | 0.155865 | 0.077932 |
| NA = 0.9 | 0.9 | 169.9578 | 8.497888 | 1.699578 | 0.849789 | 0.339916 | 0.169958 | 0084979 |
| NA = 0.85 | 0.85 | 185.2333 | 9.261666 | 1.852333 | 0.926167 | 0.370467 | 0.185233 | 0.092617 |
| NA = 0.80 | 0.8 | 201.9553 | 10.09776 | 2.019553 | 1.009776 | 0.403911 | 0.201955 | 0.100978 |
| NA = 0.7 | 0.7 | 241.1297 | 12.05648 | 2.411297 | 1.205648 | 0.482259 | 0.24113 | 0.120565 |
| NA = 0.6 | 0.6 | 291.3538 | 14.56769 | 2.913538 | 1.456769 | 0.582708 | 0.291354 | 0.145677 |
| NA = 0.5 | 0.5 | 359.4999 | 17.975 | 3.594999 | 1.7975 | 0.719 | 0.3595 | 0.17975 |

TABLE 9

| K = 0.2 | 0.2 | 100 μm<br>100 | 5 μm<br>5 | 1 μm<br>1 | 500 nm<br>0.5 | 200 nm<br>0.2 | 100 nm<br>0.1 | 50 nm<br>0.05 |
|---|---|---|---|---|---|---|---|---|
| NA = 0.95 | 0.95 | 492.8878 | 24.64439 | 4.928878 | 2.464439 | 0.985776 | 0.492888 | 0.246444 |
| NA = 0.9 | 0.9 | 537.4536 | 26.87268 | 5.374536 | 2.687268 | 1.074907 | 0.537454 | 0.268727 |
| NA = 0.85 | 0.85 | 585.7592 | 29.28796 | 5.857592 | 2.928796 | 1.171518 | 0.585759 | 0.29288 |
| NA = 0.80 | 0.8 | 638.6387 | 31.93194 | 6.386387 | 3.193194 | 1.277277 | 0.638639 | 0.319319 |
| NA = 0.7 | 0.7 | 762.519 | 38.12595 | 7.62519 | 3.812595 | 1.525038 | 0.762519 | 0.38126 |
| NA = 0.6 | 0.6 | 921.3417 | 46.06709 | 9.213417 | 4.606709 | 1.842683 | 0.921342 | 0.460671 |
| NA = 0.5 | 0.5 | 1136.839 | 56.84193 | 11.36839 | 5.684193 | 2.273677 | 1.136839 | 0.568419 |

From the results of Tables 2 to 9, the interrelationship of the numerical aperture NA, the defect area/beam spot area ratio k, the inflow gap GIN (dimensions of defect), and the thickness t of the protective cover coat transparent layer 102.

The results of Tables 2 to 4 show that with the same inflow gap $G_{IN}$, the thickness t of the protective cover coat transparent layer 102 becomes smaller as the numerical aperture NA increases.

Also, even with the same inflow gap $G_{IN}$ and same numerical aperture NA, for example even if $G_{IN}$=1 μm and NA=0.8, the thickness t of the protective cover coat transparent layer 102 becomes smaller, e.g., to 3.19 μm, 2.85 μm, and 2.6 μm, as the defect area/beam spot area ratio k increases, e.g., to 0.08, 0.1, and 0.12.

The results of Tables 2 to 4 can be applied in various ways other ways in the design of an optical recording/reproducing apparatus.

The thickness t of the protective cover coat transparent layer 102 can be determined if the numerical aperture NA of the object lens, a suitable defect area/beam spot area ratio k, for example k=0.12, and the inflow gap $G_{IN}$ are determined.

Conversely, the inflow gap $G_{IN}$ or the dimensions of the defect can be determined if the numerical aperture NA of the object lens, a suitable defect area/beam spot area ratio k, for example, k=0.12, and the thickness t of the protective cover coat transparent layer 102 are determined. Note that the desired inflow gap $G_{IN}$ is determined by calculating the spring force of the suspension 31a of the flying head 31 and the floating force of the air flow in accordance with the speed of the magneto-optical disk 1.

As explained above, the magneto-optical recording and reproducing apparatus using the flying head 31 gave a preferable defect area/beam spot area ratio k, thickness t of the protective cover coat transparent layer 102, and an inflow gap $G_{IN}$ resistant to defects. Accordingly, when producing an optical recording/reproducing apparatus by determining the thickness t of the protective cover coat transparent layer 102 of the magneto-optical disk 1, the inflow gap $G_{IN}$ between the surface of the magneto-optical disk 1 and the flying head 31, and the defect area/beam spot area ratio k based on the above conditions, it is possible to design, produce, and use a magneto-optical recording and reproducing apparatus with a high reliability free from susceptability to error without any error correction even there is a defect of the above size.

Furthermore, according to the above embodiment, it is possible to provide a magneto-optical disk 1 having a protective cover coat transparent layer 102 of a thickness t for use in a magneto-optical recording and reproducing apparatus having a laser diode wavelength, numerical aperture of an object lens, defect area/beam spot area ratio k, and flying head 31 satisfying the above conditions.

In the above embodiment, a super compact magneto-optical disk 1 was described as an example of an optical rotating recording medium, but the present embodiment is not limited to the above super compact magneto-optical disk 1. A variety of optical rotating recording media are included such as phase change optical disks, playback only optical disks, compact disks (CD), optical hard disks of optical hard disk drives (optical HDD), optical floppy disks of optical floppy disk drives (optical FDD), video disks of video disk recorders (VDR), etc. They are generally called magneto-optical rotating recording media in the present specification.

Second Embodiment

Figure 10:
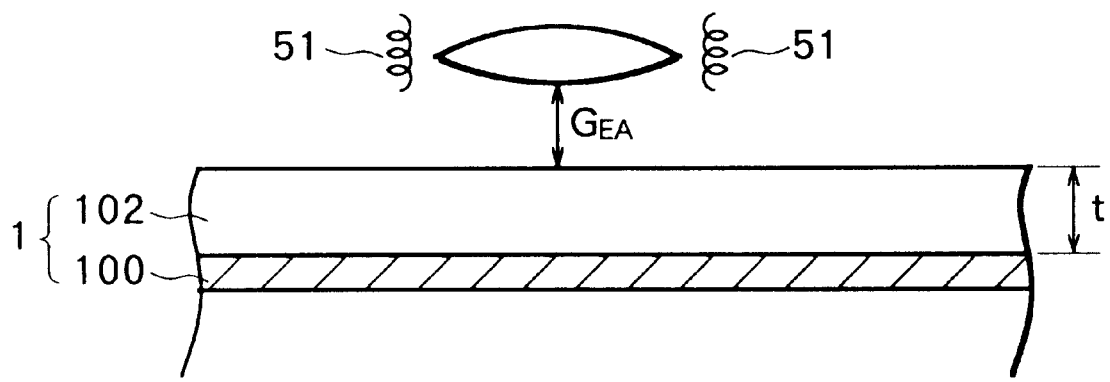
FIG. 10 is a view of a positional relationship between a magneto-optical disk and an electromagnetic actuator according to a second embodiment of the present invention.

An optical recording/reproducing apparatus using an electromagnetic actuator will be explained next with reference to FIG. 10 as a second embodiment of the present invention.

In the second embodiment, an electromagnetic actuator 50 is used as an accessing means instead of the flying head 31 of the first embodiment.

The electromagnetic actuator 50 comprises a coil 51 and controls the position of the object lens 30 with respect to the surface of the magneto-optical disk 1, that is, the separating gap $G_{EA}$, in accordance with the value of the current supplied to a coil 51.

As conditions of the above separating gap $G_{EA}$ in the second embodiment, the same conditions in the inflow gap $G_{IN}$ in the first embodiment are applied. Namely, it is sufficient to replace the inflow gap $G_{IN}$ with the separating gap $G_{EA}$ in inequalities (6) or (7).

Expressing the first and second embodiments with common terms, when the inflow gap $G_{IN}$ and the separating gap $G_{EAG1}$ are referred to as the gap G, the inequalities shown as inequalities A and B can be obtained.

In the second embodiment using the electromagnetic actuator 50 as well, the same effects as in the first embodiment can be obtained.

Other Embodiments

The present invention is not limited to the above embodiments. For example, it can be applied to a variety of other optical recording/reproducing apparatuses.

Figure 11:
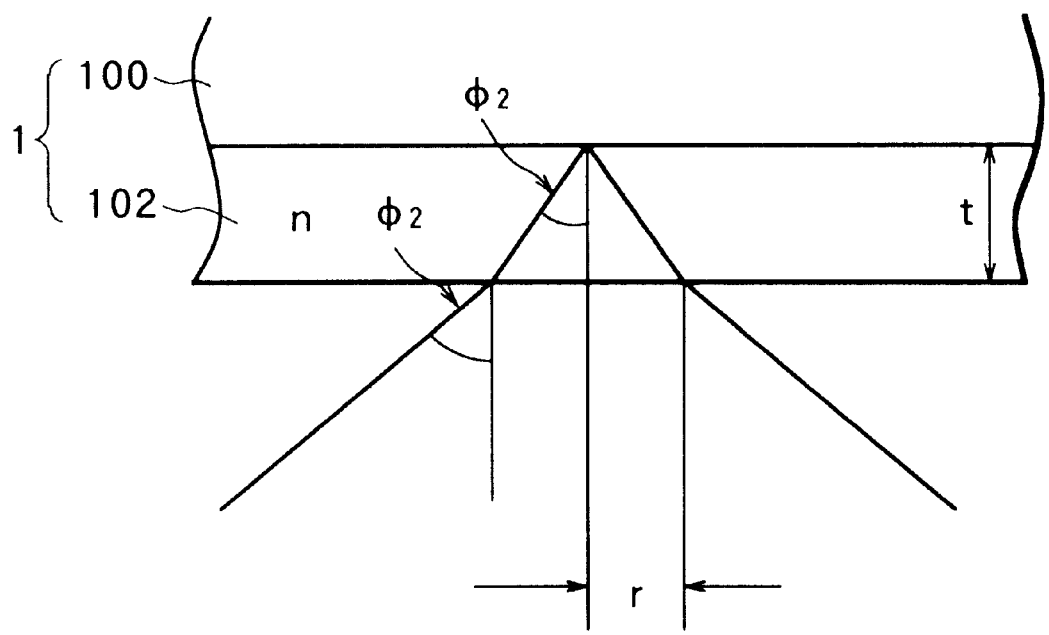
FIG. 11 is a view of the case of where the magneto-optical disk and the accessing means are reversed in positional relationship from FIG. 4.

FIG. 4 showed the case of using a flying head 31 floating from the surface of the magneto-optical disk 1 by exactly an inflow gap $G_{IN}$ and outflow gap $G_{OUT}$, but the gap between the magneto-optical disk 1 and the head or electromagnetic actuator or other accessing means is not limited to the case of positioning the accessing means above the magneto-optical disk 1. Needless to say, the present invention can also be applied to an accessing means positioned below the magneto-optical disk 1 as shown in FIG. 11.

Summarizing the effects of the invention, according to the present invention, the thickness of the protective transparent layer of the optical rotating recording medium and the gap between the accessing means and optical rotating recording medium are determined so as not to be affected by a defect.

Accordingly, if using an optical rotating recording medium having the above protective transparent layer and the accessing means separated from the optical rotating recording medium by a predetermined gap, it is possible to design an optical recording/reproducing apparatus with a high reliability free from the effects of defects of a permissible dimensions.

The optical recording/reproducing apparatus of the present invention produced based on such a design can operate with a high reliability.

Also, according to the present invention, a variety of optical recording/reproducing media having the above protective transparent layer can be produced for use in such optical recording/reproducing apparatus.

While the invention has been described-with reference to specific embodiment chosen for purpose of illustration, it should be apparent that numerous modifications could be made thereto by those skilled in the art without departing from the basic concept and scope of the invention.

What is claimed is:

1. An optical recording/reproducing apparatus accessing a recording layer of an optical rotating recording medium using an accessing means positioned a predetermined gap away from a surface of said optical rotating recording medium and mounted with an object lens, wherein:

a thickness of a protective transparent layer of said optical rotating recording medium, a ratio of a defect area with respect to a beam spot area, and the above predetermined gap are values determined by the conditions defined in the following inequalities:

$$G_1 \leq t \cdot \sqrt{k\pi} \times \tan\left\{\sin^{-1}\left(\frac{NA}{n}\right)\right\}$$

or $$t \geq \frac{G}{\sqrt{k\pi} \cdot \tan\left\{\sin^{-1}\left(\frac{NA}{n}\right)\right\}}$$

where,

G is a gap separating accessing means from surface of optical rotating recording medium, t is a thickness of transparent layer positioned at surface of recording medium of optical rotating recording medium, n is a refractive index of transparent layer, and
NA is a numerical aperture of optical system including object lens.

2. An optical recording/reproducing apparatus as set forth in claim 1, wherein:
said accessing means is a head separated from said optical rotating recording medium by a flow of air caused by rotation of said optical rotating recording medium, and
said predetermined gap is a gap for inflowing air between said head and said optical rotating recording medium.

3. An optical recording/reproducing apparatus as set forth in claim 2, wherein said ratio k of the defect area with respect to the beam spot area is in the range of 0.02 to 0.2.

4. An optical recording/reproducing apparatus as set forth in claim 3, wherein said thickness of the protective transparent layer and said gap are determined in said ratio k of the defect area with respect to the beam spot area and use is made of an optical rotating recording medium having said thickness and a head accessing said optical rotating recording medium while separated from it.

5. An optical recording/reproducing apparatus as set forth in claim 4, wherein said optical rotating recording medium includes a magneto-optical disk using light and magnetism, a phase change optical disk using only light, a playback only optical disk, a compact disk, an optical hard disk, an optical floppy disk, and a video disk.

6. An optical recording/reproducing apparatus as set forth in claim 1, wherein:
said accessing means is an electromagnetic actuator positioned away from said optical rotating recording medium by a predetermined gap, and
said predetermined gap is a gap between said electromagnetic actuator and said optical rotating recording medium.

7. An optical recording/reproducing apparatus as set forth in claim 6, wherein said ratio k of the defect area with respect to the beam spot area is in the range of 0.02 to 0.2.

8. An optical recording/reproducing apparatus as set forth in claim 7, where said thickness of the protective transparent layer and said gap are determined in said ratio k of the defect area with respect to the beam spot area and an optical rotating recording medium having said thickness and an electromagnetic actuator positioned away from said optical rotating recording medium by said gap are used.

9. An optical recording/reproducing apparatus as set forth in claim 8, where said optical rotating recording medium includes a magneto-optical disk using light and magnetism, a phase change optical disk using only light, a playback only optical disk, a compact disk, an optical hard disk, an optical floppy disk, and a video disk.

10. An optical recording/reproducing apparatus accessing a recording layer of an optical rotating recording medium using an accessing means positioned away from a surface of said optical rotating recording medium by a predetermined gap and mounted with an object lens, wherein:
the distance of said accessing means from the surface of said optical rotating recording medium is made to be a value defined by the following inequality:

$$t \geq \frac{G}{\sqrt{k\pi} \cdot \tan\left\{\sin^{-1}\left(\frac{NA}{n}\right)\right\}}$$

where,
G is a gap separating accessing means from surface of optical rotating recording medium,
t is a thickness of transparent layer positioned at surface of recording medium of optical rotating recording medium,
n is a refractive index of transparent layer, and
NA is a numerical aperture of optical system including object lens.

11. An optical recording/reproducing apparatus as set forth in claim 10, wherein said ratio k of the defect area with respect to the beam spot area is in the range of 0.02 to 0.2.

12. An optical recording/reproducing apparatus as set forth in claim 11, wherein:
said accessing means is an electromagnetic actuator positioned away from said optical rotating recording medium by a predetermined gap, and
said predetermined gap is a gap between said electromagnetic actuator and said optical rotating recording medium.

13. An optical recording/reproducing apparatus as set forth in claim 11, wherein:
said accessing means is a head separated from said optical rotating recording medium by a flow of air caused by rotation of said optical rotating recording medium, and
said predetermined gap is a gap for inflowing air between said head and said optical rotating recording medium.

14. An optical rotating recording medium to be used in the optical recording/reproducing apparatus accessing a recording layer of an optical rotating recording medium using an accessing means positioned away from a surface of said optical rotating recording medium by a predetermined gap and mounted with an object lens, wherein:
the optical rotating recording medium has a protective transparent layer of a thickness defined by the following inequality:

$$t \geq \frac{G}{\sqrt{k\pi} \cdot \tan\left\{\sin^{-1}\left(\frac{NA}{n}\right)\right\}}$$

where,
G is a gap separating accessing means from surface of optical rotating recording medium,
t is a thickness of transparent layer positioned at surface of recording medium of optical rotating recording medium,
n is a refractive index of transparent layer, and
NA is a numerical aperture of optical system including object lens.

15. An optical rotating recording media as set forth in claim 14, said optical rotating recording medium includes a magneto-optical disk using light and magnetism, a phase change optical disk using only light, a playback only optical disk, a compact disk, an optical hard disk, an optical floppy disk, and a video disk.

16. A method of designing an optical recording/reproducing apparatus accessing a recording layer of an optical rotating recording medium using an accessing means positioned away from a surface of said optical rotating recording medium by a predetermined gap and mounted with an object lens, comprising
designing said optical recording/reproducing apparatus so that a thickness of a protective transparent layer of said optical rotating recording medium, a ratio of a defect area with respect to a beam spot area, and the above predetermined gap satisfy the conditions defined by the following inequalities:

$$G_1 \le t \cdot \sqrt{k\pi} \times \tan\left\{\sin^{-1}\left(\frac{NA}{n}\right)\right\}$$

or $$t \ge \frac{G}{\sqrt{k\pi} \cdot \tan\left\{\sin^{-1}\left(\frac{NA}{n}\right)\right\}}$$

where,

G is a gap separating accessing means from surface of optical rotating recording medium, t is a thickness of transparent layer positioned at surface of recording medium of optical rotating recording medium, n is a refractive index of transparent layer, and NA is a numerical aperture of optical system including object lens.

17. A method of designing an optical recording/reproducing apparatus as set forth in claim 16, wherein said ratio k of the defect area with respect to the beam spot area is in the range of 0.02 to 0.2.

18. A method of designing an optical recording/reproducing apparatus as set forth in claim 17, wherein:

said accessing means is a head separated from said optical rotating recording medium by a flow of air caused by rotation of said optical rotating recording medium, and said predetermined gap is a gap for inflowing air between said head and said optical rotating recording medium.

19. A method of designing an optical recording/reproducing apparatus as set forth in claim 17, wherein:

said accessing means is an electromagnetic actuator positioned away from said optical rotating recording medium by a predetermined gap, and said predetermined gap is a gap between said electromagnetic actuator and said optical rotating recording medium.

20. A method of designing an optical recording/reproducing apparatus as set forth in claim 16, wherein said optical rotating recording medium includes a magneto-optical disk using light and magnetism, a phase change optical disk using only light, a playback only optical disk, a compact disk, an optical hard disk, an optical floppy disk, and a video disk.

* * * * *

UNITED STATES PATENT AND TRADEMARK OFFICE
CERTIFICATE OF CORRECTION

PATENT NO. : 6,496,450 B2
DATED : December 17, 2002
INVENTOR(S) : Tetsu Watanabe It is certified that error appears in the above-identified patent and that said Letters Patent is hereby corrected as shown below:

Column 1,
Line 53, insert -- , -- after "disk".

Column 4,
Line 18, change "surface-of" to -- surface of --.

Column 10,
Line 34, change "$r = \tan\phi_1 = t \cdot \tan(\sin)^{-1}\left(\frac{NA}{n}\right)$" to -- $r = \tan\phi_1 = t \cdot \tan\left(\sin^{-1}\left(\frac{NA}{n}\right)\right)$ --

Column 13,
Line 17, change "t" to -- it --.

Column 14,
Table 2, line 3, change "0.402111" to -- 0.402441 --;
Table 2, line 8, change "18.80881" to -- 18.80681 --; change "1.880881" to -- 1.880681 --; and change "0.188088" to -- 0.188068 --.
Table 3, line 9, change "25.12048" to -- 25.42048 --.

Column 15,
Table 7, line 5, change "10.35186" to -- 10.35486 --; and change "1.035186" to -- 1.035486 --.
Table 7, line 7, change "13.17956" to -- 13.47956 --.
Table 9, line 1, change "K=0.2  0.2" to -- K=0.02  0.02 --.
Line 62, change "GIN" to -- $G_{IN}$ --.

Column 16,
Lines 65-66, change "ways other ways in" to -- ways in --.

Column 17,
Lines 27-28, change "even there" to -- even when there --.

UNITED STATES PATENT AND TRADEMARK OFFICE
CERTIFICATE OF CORRECTION

PATENT NO.    : 6,496,450 B2
DATED         : December 17, 2002
INVENTOR(S)   : Tetsu Watanabe It is certified that error appears in the above-identified patent and that said Letters Patent is hereby corrected as shown below:

<u>Column 18,</u>
Line 35, change "-with" to -- with --.

Signed and Sealed this

Fifteenth Day of July, 2003

JAMES E. ROGAN
*Director of the United States Patent and Trademark Office*